(12) United States Patent
Wilson-Jones et al.

(10) Patent No.: US 11,597,429 B2
(45) Date of Patent: Mar. 7, 2023

(54) ELECTRIC POWER ASSISTED STEERING

(71) Applicant: TRW Limited, Solihull (GB)

(72) Inventors: Russell Wilson-Jones, Stratford-upon-Avon (GB); Nigel Smith, Eardiston (GB); Timothy Buttery, Halesowen (GB); Andrew Reynolds, Wootton Bassett (GB); Thomas Haines, Vale of Glamorgan (GB)

(73) Assignee: ZF Automotive UK Limited

( * ) Notice: Subject to any disclaimer, the term of this patent is extended or adjusted under 35 U.S.C. 154(b) by 540 days.

(21) Appl. No.: 16/623,170

(22) PCT Filed: Jun. 22, 2018

(86) PCT No.: PCT/GB2018/051755
§ 371 (c)(1),
(2) Date: Dec. 16, 2019

(87) PCT Pub. No.: WO2018/234829
PCT Pub. Date: Dec. 27, 2018

(65) Prior Publication Data
US 2021/0139071 A1 May 13, 2021

(30) Foreign Application Priority Data

Jun. 23, 2017 (GB) ..................................... 1710104

(51) Int. Cl.
*B62D 5/04* (2006.01)
*F16B 5/04* (2006.01)
(Continued)

(52) U.S. Cl.
CPC ......... *B62D 5/0406* (2013.01); *B62D 5/0409* (2013.01); *F16B 5/04* (2013.01);
(Continued)

(58) Field of Classification Search
CPC ....... B62D 5/0406; B62D 5/0409; F16B 5/04; F16H 57/025; F16H 2057/02034; F16H 2057/02082
See application file for complete search history.

(56) References Cited

U.S. PATENT DOCUMENTS 6,463,829 B2 * 10/2002 Torii ........................ H02K 5/10
74/606 R
6,577,030 B2 * 6/2003 Tominaga ............... H02K 11/33
310/68 B (Continued)

FOREIGN PATENT DOCUMENTS

EP 2960136 A1 12/2015
JP 2006021701 A 1/2006
(Continued)

*Primary Examiner* — James A Shriver, II
*Assistant Examiner* — Conan D Duda
(74) *Attorney, Agent, or Firm* — Robert James Harwood

(57) ABSTRACT

A combined motor and gearbox assembly for an electric power steering system comprising an electric motor, a gearbox which includes a gearset that is connected on an input part to a rotor of the motor and in use is connected on an output part at least indirectly to a steering column shaft to transfer torque from the motor rotor to the steering column shaft, a motor drive circuit, a gearbox housing which in use accommodates the gearset of the gearbox, the electric motor including a motor housing, and a baseplate which connects an end face of the gearbox housing to an end face of the gearbox housing and which supports the drive circuit. At least one bolt having a stem passes through a central hole in a tubular rivet that secures the motor housing to the baseplate, the bolt securing the baseplate to the gearbox housing.

9 Claims, 4 Drawing Sheets

(51) Int. Cl.
*F16H 57/025* (2012.01)
*F16H 57/02* (2012.01)

(52) U.S. Cl.
CPC ............. *F16H 57/025* (2013.01); *F16H 2057/02034* (2013.01); *F16H 2057/02082* (2013.01)

(56) References Cited

U.S. PATENT DOCUMENTS

| | | | | |
|---|---|---|---|---|
| 6,745,865 | B2* | 6/2004 | Hama | H02K 5/225 310/239 |
| 11,059,524 | B2* | 7/2021 | Terada | B62D 25/06 |
| 2006/0045649 | A1* | 3/2006 | Johnson | F16B 5/04 411/38 |
| 2007/0205038 | A1* | 9/2007 | Tominaga | B62D 5/0406 180/444 |
| 2008/0054744 | A1* | 3/2008 | Fornoff | H02K 5/00 411/501 |
| 2010/0288577 | A1* | 11/2010 | Sonoda | H02K 7/1166 180/446 |
| 2010/0314192 | A1* | 12/2010 | Nagase | H02K 5/1735 180/444 |
| 2011/0066332 | A1* | 3/2011 | Sonoda | H02K 7/1166 701/42 |
| 2012/0272765 | A1* | 11/2012 | Fuechsel | F16C 35/045 74/416 |
| 2012/0313467 | A1* | 12/2012 | Omae | B62D 5/0406 310/71 |
| 2013/0300235 | A1* | 11/2013 | Akutsu | B62D 5/0406 310/71 |
| 2014/0077638 | A1* | 3/2014 | Nakai | H05K 1/0203 310/71 |
| 2015/0318753 | A1* | 11/2015 | Akutsu | H02K 5/10 310/71 |
| 2016/0348707 | A1* | 12/2016 | Wu | F16B 19/1081 |
| 2017/0217591 | A1* | 8/2017 | Hirose | F16B 19/1081 |
| 2017/0274927 | A1* | 9/2017 | Hagiwara | H05K 5/0047 |
| 2018/0372144 | A1* | 12/2018 | Beer | F16B 37/067 |
| 2019/0248406 | A1* | 8/2019 | Kaneko | H02K 5/15 |
| 2020/0072271 | A1* | 3/2020 | Couderc | F16B 5/02 |
| 2020/0096032 | A1* | 3/2020 | Blaski | F16B 19/1072 |
| 2021/0139071 | A1* | 5/2021 | Wilson-Jones | B62D 5/0409 |
| 2022/0353574 | A1* | 11/2022 | Berthelot | H04W 4/23 |

FOREIGN PATENT DOCUMENTS

| | | |
|---|---|---|
| JP | 2008290614 A | 12/2008 |
| JP | 2013106410 A | 5/2013 |

* cited by examiner

ELECTRIC POWER ASSISTED STEERING

CROSS-REFERENCE TO RELATED APPLICATION

This application is a national stage of International Application No. PCT/GB2018/051755, filed Jun. 22, 2018, the disclosure of which is incorporated herein by reference in its entirety, and which claimed priority to UK Patent Application No. 1710104.9, filed Jun. 23, 2017, the disclosure of which is incorporated herein by reference in its entirety.

TECHNICAL FIELD

This invention relates to electric power assisted steering systems of the kind comprising an electric motor that applies an assistance torque to the steering gear through a gearbox. In particular it relates to a combined motor and gearbox assembly.

BACKGROUND

It is known to provide an electric power assisted steering system in which an electric motor applies an assistance torque to the steering gear through a gearbox. In a typical system, a torque sensor is provided that measures the torque applied to the steering clear by the driver when turning the steering wheel. This measurement is fed to a control circuit which determines a torque demand signal representative of an amount of assistance torque that is to be applied by the motor. The demanded torque signal is fed to a motor drive circuit which generates a set of motor phase currents that are applied to the motor. These currents cause the motor rotor to apply the demanded torque. The rotor is connected to a gearbox, which typically comprises a worm gear formed on the end of the rotor engaging a wheel gear that is connected directly or indirectly to the steering gear. The steering gear may comprise a steering column shaft.

The space available to locate the motor, the drive circuit and the control circuit, as well as the gearbox is often very limited. A compact assembly is therefore desirable, and typically the worm and wheel gear are located in a gearbox housing with the electric motor, the drive circuit and control circuit located in a secondary housing that is in turn fixed to the gearbox housing. The drive circuit and control circuit may, for convenience, be located in a further housing that is fixed to the secondary housing. This allows the electrical components to be assembled and tested in one piece and then mated to the gearbox and other steering components such as the steering shaft and, where provided, the torque sensor.

SUMMARY

The applicant has appreciated that improvements can be made in the way the housings are connected together that may reduce the overall size of the package to allow flexibility in the use of the space of the package.

According to a first aspect the invention provides a combined motor and gearbox assembly for an electric power steering system comprising: an electric motor, a gearbox, a motor drive circuit, a gearbox housing, and a base plate. The gear box includes a gearset that is connected on an input part to a rotor of the motor and in use is connected at an output part at least indirectly to a steering column shaft to transfer torque from the motor rotor to the steering column shaft. The gearbox housing accommodates the gearset of the gearbox. The electric motor includes a motor housing. The baseplate connects an end face of the gearbox housing to an end face of the gearbox housing and supports the motor drive circuit. The baseplate includes at least one tubular rivet having a central through hole that secures the motor housing to the baseplate, and at least one bolt having a stem that passes through the through hole in the tubular rivet and secures the baseplate to the gearbox housing.

In a method of assembly the motor may be attached to the baseplate first to form an Electric Power Pack (EPP). This allows the motor and ECU to be tested. In a second step, the baseplate may be attached to the gearbox, connecting the rotor to the gears in the gearbox housing.

The present disclosure appreciates that placing the bolt through the rivet requires less space compared with a separate offset fastening for the motor to the baseplate and then from the baseplate to the gearbox housing. There may be three tubular rivets that each connect the motor housing to the baseplate, and three bolts that each have a stem that passes through a respective hole in a respective hollow rivet to connect the electric power pack to the gearbox.

Each rivet may comprise a flat headed tubular rivet having a hollow cylindrical shaft, an enlarged head at one end and a tail of deformed material at the other end. The head may be located on the side of the baseplate opposite to the gearbox housing, but could be located on the other side of the baseplate depending on which side provides the best access for fixing the rivet during assembly. The head and tail are both hollow allowing access to the bore through the shaft for insertion of the bolt.

The hollow shaft of the rivet may pass through a complementary shaped hole in the motor housing and in the baseplate. The two holes may be cylindrical and may be aligned on a common axis that is also aligned with the axis of the shaft of the rivet. Each bolt may carry an external thread on at least an end portion of the shaft furthest from the head of the bolt, which may be received in a complementary internally threaded hole in the gearbox housing. Each bolt may have an oversized head that protrudes radially beyond the bore of the rivet to overlap the head of the rivet. The surface of the gearbox housing immediately surrounding the threaded bore may be recessed relative to the surrounding surface to accommodate the thickness of the rivet tail. This enables the baseplate to sit flush onto the gearbox housing to provide a good seal between the gearbox housing and baseplate.

The motor drive circuit may comprise an electronic control unit (ECU) which may comprise at least one processing chip fixed to a baseplate or printed circuit board. The drive circuit may further include a plurality of drive stage switches which form a bridge circuit. These may also be connected to the baseplate. There may be a plurality of electrically conductive tracks supported by the baseplate, or a leadframe fixed to the baseplate, that connect the control circuit to the drive circuit. This leadframe may also be connected to the baseplate. To aid assembly, the gearbox housing may be provided with a protruding alignment dowel that engages in an alignment hole in the base plate. There may be multiple alignment dowels, each engaging an alignment hole.

As an alternative or in addition, a dowel or dowels may protrude from the base plate and engage respective alignment holes in the gearbox housing. Once the dowels are engaged, the bore in the rivet will be aligned with the bore in the gearbox housing.

The motor housing may comprise an open ended generally cylindrical can, with a flange extending around the periphery of the open end, the flange being provided with the at least one hole through which the at least one rivet extends. The gearset may comprise a wormshaft coupled to the rotor of the motor and a wormwheel that engages the wormshaft, the wheel gear transferring torque to the steering gear when in use. The apparatus may also include a motor position sensor that is fixed to the base plate and detects the positon of the motor rotor.

BRIEF DESCRIPTION OF THE FIGURES

There will now be described by way of example only one embodiment of the present invention with reference to the accompanying drawings of which.

DETAILED DESCRIPTION

Figure 1:
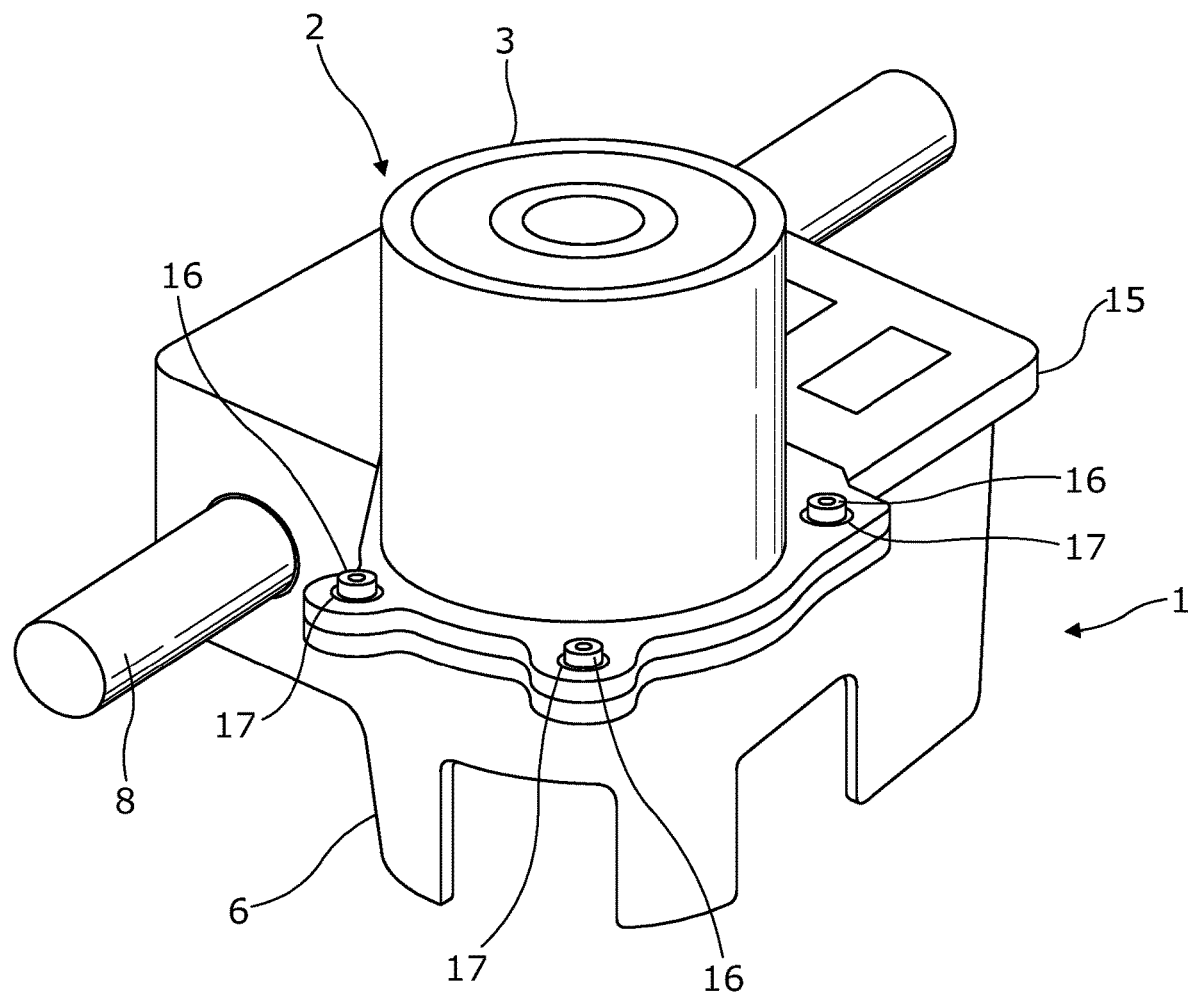
FIG. 1 is an isometric view of an embodiment of an electric steering sub-assembly in accordance with the present invention.
Figure 6:
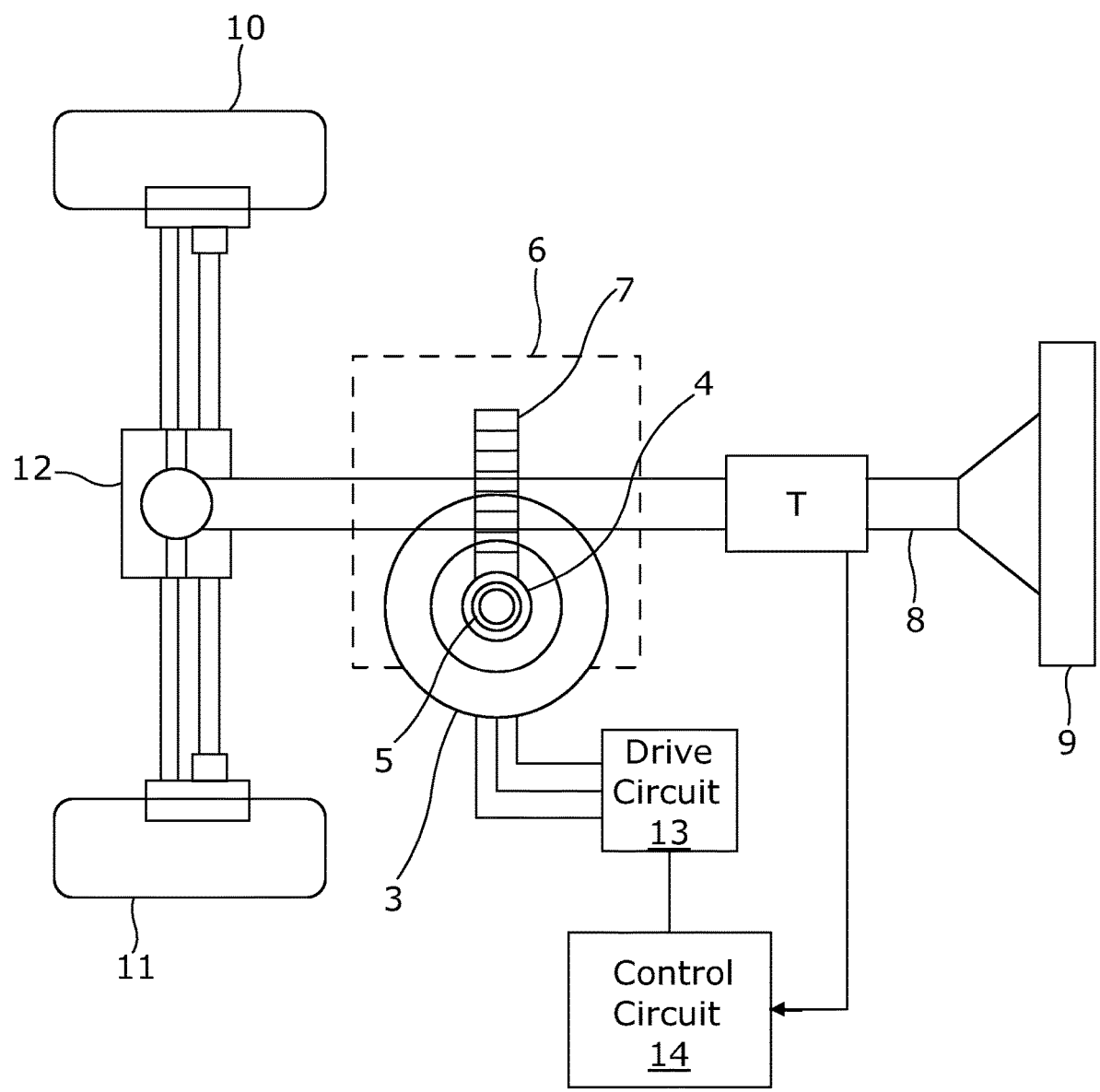
FIG. 6 is a schematic view of a complete steering assembly incorporating the sub-assembly of FIG. 1.

As shown in FIG. 1, an electric steering sub-assembly 1 comprises an electric motor 2 located within a housing 3 in the form of a cylindrical can which is open at one end. The motor 2 includes a rotor 4 (visible in the schematic drawing of FIG. 6). This rotor is accessible through an opening in the housing and in use is fixed to a wormshaft 5 of a gearbox. The motor 2 is fixed to a gearbox housing 6 of the gearbox which accommodates the Wormshaft and also a worm wheel 7 on an input part of the gearbox (shown in the schematic of FIG. 6). In this example, the wormwheel is also connected to a steering column shaft 8 on the output part of the gearbox so that turning the wormwheel turns the input part and the output shaft. The steering column shaft 8 in use connects a steering wheel 9 of a vehicle to the road wheels 10, 11, typically through a rack and pinion 12.

The motor 2 may be of any type but is preferably a three phase permanent magnet motor. The motor 2 is driven by a motor drive circuit 13 which typically comprises a three phase bridge driver circuit. The motor drive circuit 13 applies voltages to each phase in response to a torque demand signal received from a control circuit 14. In this example, the control circuit is combined with the drive circuit to form a close coupled electrical circuit.

To join the motor housing 3 to the gearbox housing 6 and to also support the motor drive circuit including a motor control circuit a baseplate 15 is provided. This is a generally flat plate which seals the open end face of the motor housing can 3, and also seals a facing opening of the gearbox housing 6. The plate 15 is oversized to allow the drive circuit and control circuit to be located on the plate 15 offset from the motor can.

The baseplate 15 is sandwiched between the gearbox housing 6 and the motor can 3 and all three are fixed in place by three hollow tubular rivets 16 and three bolts 17, each bolt 17 passing through the hollow rivet 16 to engage the gearbox housing. The manner in which the motor housing 3, baseplate 15 and gearbox housing 6 are fixed together will can best be understood referring to FIGS. 2 to 5 which show a preferred sequence of assembly.

Figure 2:
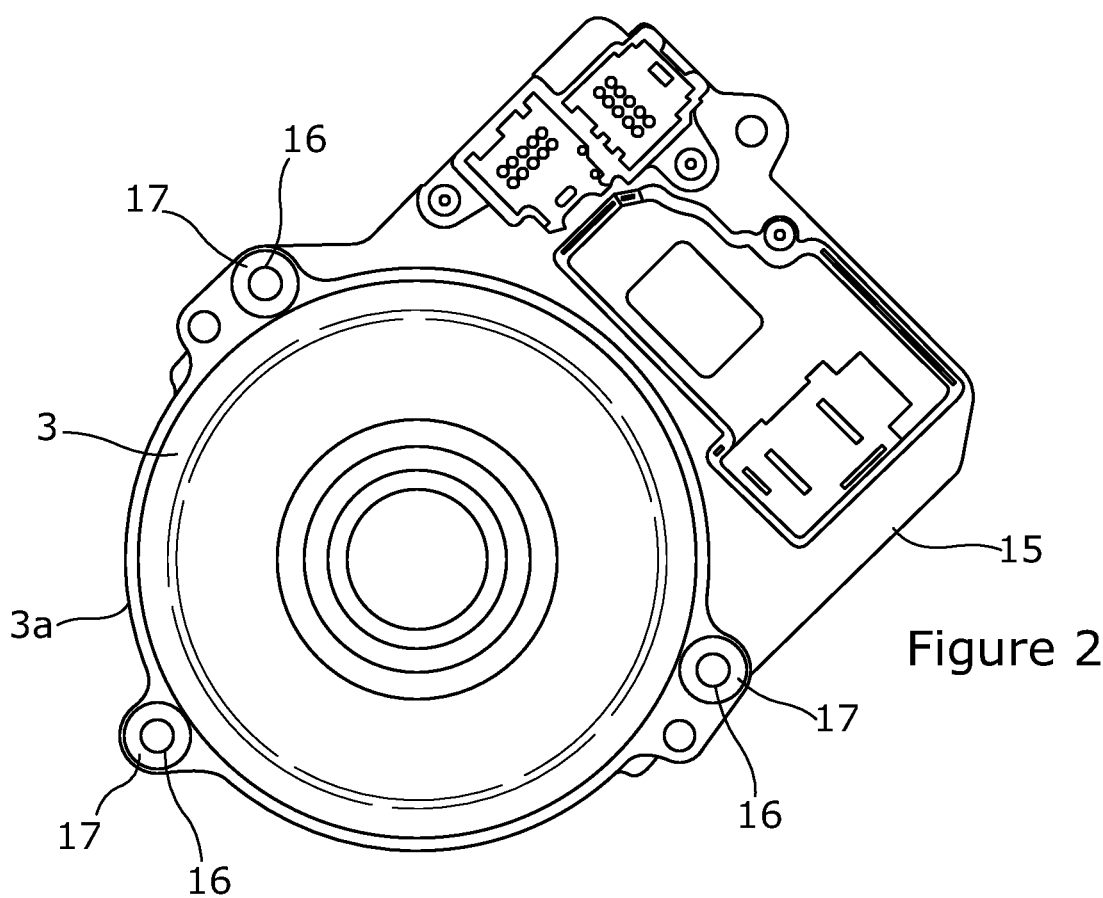
FIG. 2 is a view from above of the motor can during fixing to the baseplate prior to fixing to the gearbox housing.
Figure 3:
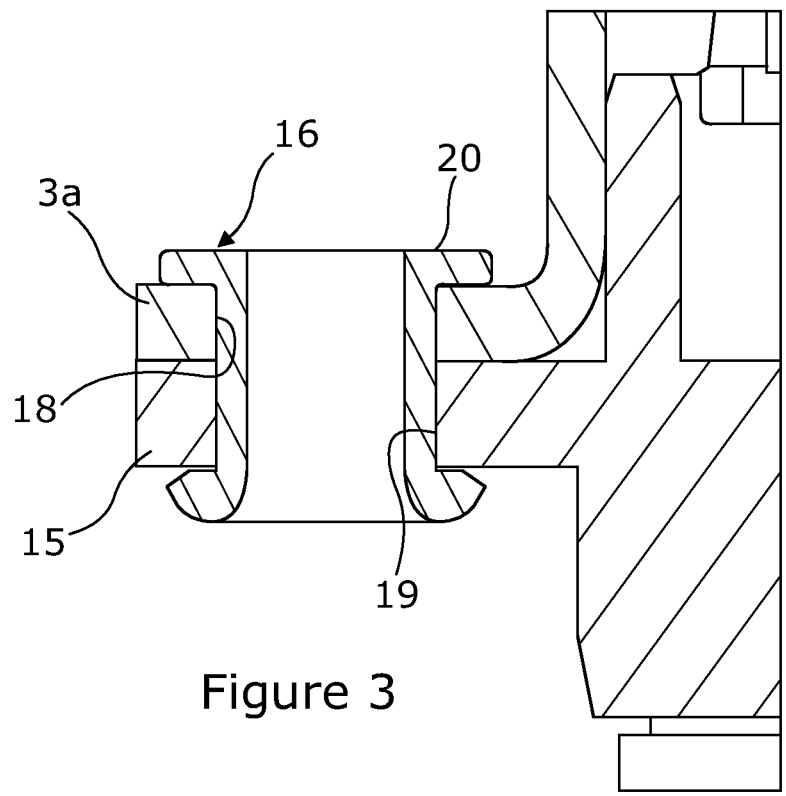
FIG. 3 is a detail view showing one hollow rivet connecting the motor can to the baseplate.
Figure 4:
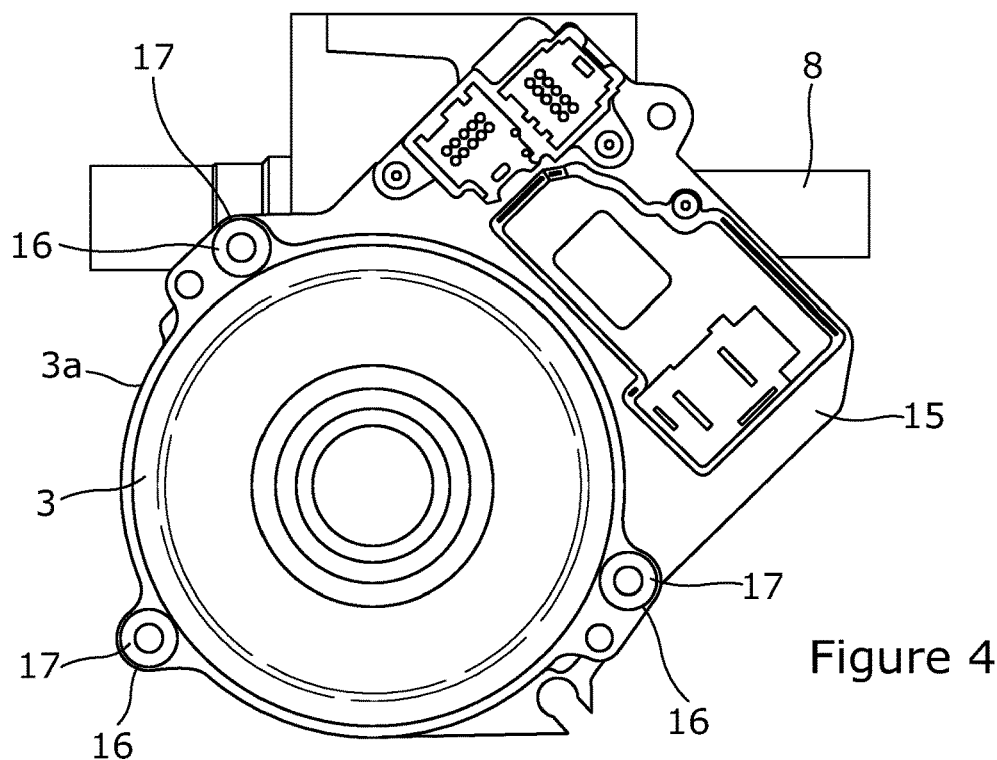
FIG. 4 is view corresponding to the view of FIG. 2 once the motor can and baseplate have been bolted to the gearbox housing.
Figure 5:
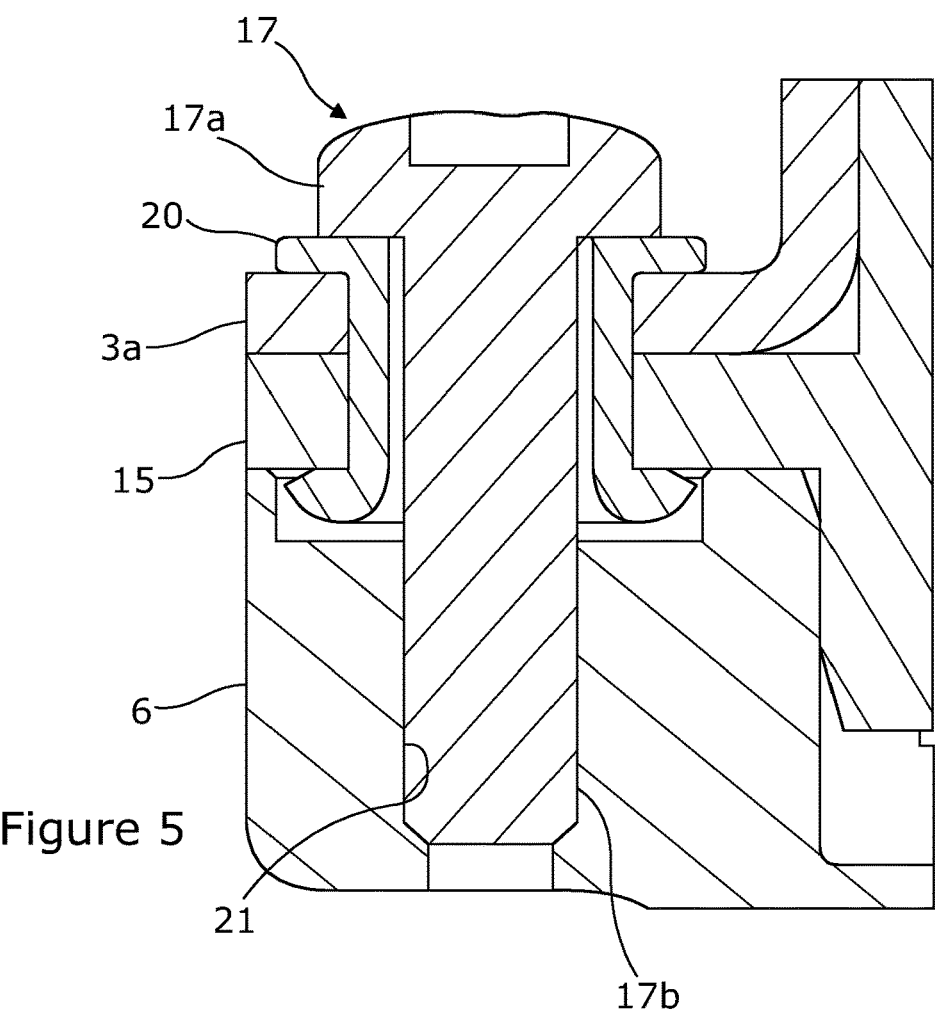
FIG. 5 is a detail view corresponding to the view of FIG. 3 once the motor can and baseplate have been fixed to the gearbox housing.

In a first stage of assembly, shown in FIGS. 2 and 3, the motor can 3 is fixed to the baseplate 15 and the drive stage circuit 13 and control stage 14 circuit are also fixed to the baseplate 15. The motor can 3 has a flange 3*a* around the periphery of its open end, and at spaced locations around the flange 3*a* are three cylindrical walled holes 18. These are aligned with three corresponding through holes 19 in the baseplate 15 and the stem of a hollow cylindrical rivet 16 is located through these holes with the head 20 of the rivet pressed onto the face of the flange around the hole and the tail on the opposing face of the baseplate around the hole. The rivet 16 can be installed by a conventional pressing process with a forming tool. Thus connected these components form an electrical power pack. At this stage, the electrical connections between the motor and drive stage and control stage can be made, and a motor position sensor, if required, can be attached or calibrated.

In a next stage, the baseplate 15 is offered up to the gearbox housing 6 to bring the motor rotor into engagement with the wormshaft 5 which is exposed on a side of the gearbox housing. In this position, the three holes 19 in the baseplate 15 are aligned with three threaded bores 21 in the gearbox housing spaced around the exposed end of the Wormshaft. A bolt 17 with a stem 17*b* having a complementary thread is then inserted through the hole in the rivet and threaded into the hole in the gearbox housing until the head 17*a* of the bolt 17 contacts down onto the head 20 of the rivet.

When assembled in this manner, the space needed to fasten the motor can 3 to the base plate 15 and then to fasten to the gearbox housing 6 is reduced as the fastenings are in the same axial location. Without the use of the hollow rivet, additional room for locating the bolts offset from the fasteners that hold the motor can to the baseplate would be needed. Notably, once finally assembled the bolt takes the tensile and shear loads between the gearbox housing and the baseplate and motor can, so that the rivet provides only a secondary function in taking that load. The rivet therefore only needs to be strong enough to hold the motor can to the baseplate during the first stage of assembly.

The invention claimed is:

1. A combined motor and gearbox assembly for an electric power steering system comprising:

an electric motor, a gearbox which includes a gearset that is connected on an input part to a rotor of the motor and in use is connected at an output part at least indirectly to a steering column shaft to transfer torque from the motor rotor to the steering column shaft, a motor drive circuit, a gearbox housing which in use accommodates the gearset of the gearbox, the electric motor including a motor housing, and a baseplate which connects an end face of the gearbox housing to an end face of the motor housing and which supports the drive circuit, characterised by further comprising:
at least one tubular rivet having a central through hole that secures the motor housing to the baseplate, and At least one bolt having a stem that passes through the through hole in the tubular rivet and secures the baseplate to the gearbox housing;
wherein the surface of the gearbox housing immediately surrounding the threaded bore is recessed relative to the surrounding surface to accommodate the thickness of the rivet tail.

2. The combined motor and gearbox assembly according to claim 1 which includes three tubular rivets that each connect the motor housing to the baseplate, and three bolts that each have a stem that passes through a respective hole in a respective hollow rivet to connect the motor housing and the baseplate to the gearbox.

3. The combined motor and gearbox assembly according to claim 1 in which each rivet comprises a flat headed tubular rivet having a hollow cylindrical shaft, an enlarged head at one end and a tail of deformed material at the other end.

4. The combined motor and gearbox assembly according to claim 3 in which the head is located on the side of the baseplate opposite to the gearbox housing.

5. The combined motor and gearbox assembly according to claim 3 in which the head and tail are both hollow allowing access to the bore through the shaft for insertion of the bolt.

6. The combined motor and gearbox assembly according to claim 5 in which the hollow shaft of the rivet passes through a complementary shaped hole in the motor housing and in the baseplate.

7. The combined motor and gearbox assembly according to claim 6 in which the two holes are cylindrical and aligned on a common axis, that is also aligned with the axis of the shaft of the rivet.

8. The combined motor and gearbox assembly according to claim 1 in which each bolt carries an external thread on at least an end portion of the shaft furthest from the head of the shaft, which thread is received in a complementary internally threaded hole in the gearbox housing.

9. The combined motor and gearbox assembly according to claim 1 in which the motor drive circuit comprises an electronic control unit (ECU) which may comprise at least one processing chip fixed to the baseplate.

* * * * *